Patented Apr. 25, 1933 1,906,133

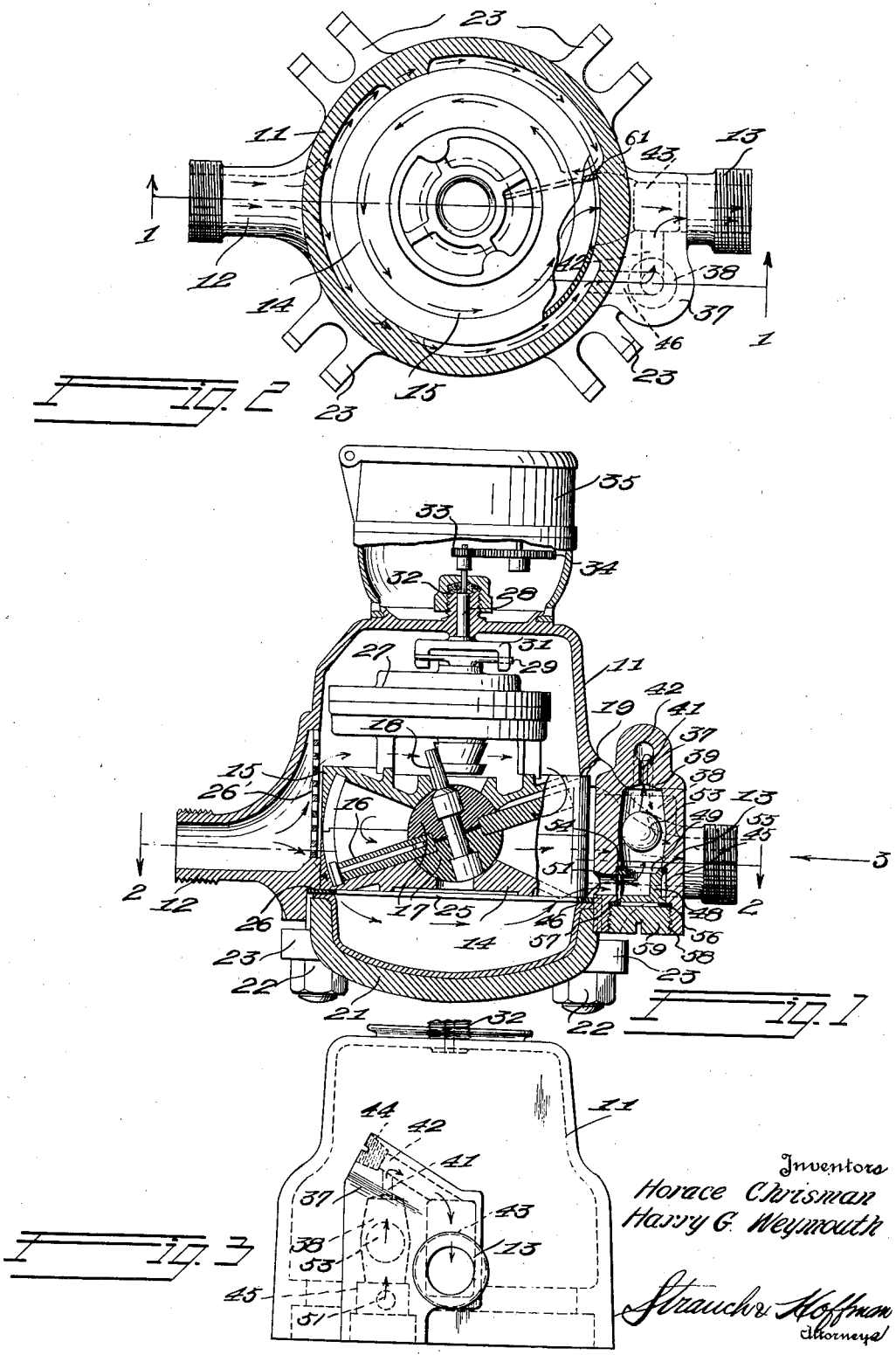

UNITED STATES PATENT OFFICE

HORACE CHRISMAN AND HARRY G. WEYMOUTH, OF PITTSBURGH, PENNSYLVANIA, ASSIGNORS TO PITTSBURGH EQUITABLE METER COMPANY, OF PITTSBURGH, PENNSYLVANIA, A CORPORATION OF PENNSYLVANIA

METER BY-PASS CONTROLLING MEANS

Application filed September 26, 1929. Serial No. 395,421.

The present invention relates to fluid meters. More particularly the invention relates to fluid meters provided with by-pass constructions for effecting an accurate registration by the meters irrespective of variations in the rate of flow therethrough.

Fluid meters, as heretofore constructed that indicated accurately the amount passing through the meter at one rate of flow did not function accurately at different rates of flow. At intermediate flows a greater registration occurred than at maximum and minimum flows so that if the meter were constructed to give an accurate indication at one flow it did not do so at another.

Fluid meters have been provided with various forms of manually adjustable by-pass constructions for by-passing more or less fluid in order that the registration on the meters would correspond to the actual volume of fluid passed. Such constructions did not, however, overcome the variations in registration at different rates of flow which occurs as above pointed out.

In the forms of by-pass constructions as heretofore provided having manually adjustable by-pass valves, the by-pass has communicated with the main casing at various points in the meter at which the fluid is more or less turbulent dependent upon the pressure and rate of flow.

A primary object of the present invention is to provide a fluid meter comprising means for effecting substantially accurate registration of fluid passed irrespective of the rate of fluid flow through said meter.

A further object of the invention is to provide a fluid meter having means automatically adjustable by the fluid flowing through the meter for correcting the variations between the indicated and actual flows to the end that substantially accurate registration of fluid passed at all rates of flow through said meter may be obtained.

Another object of this invention is to provide a fluid meter having an automatically compensating by-pass, the by-pass communicating with the meter casing at a point where the turbulence of the fluid is at a minimum.

A still further object of the invention is to provide a fluid meter having a by-pass construction, said by-pass construction embodying a bodily movable valve carried by the fluid stream so as to automatically adjust the rate of flow through said meter for varying the volume of fluid by-passed at all rates of flow through said meter which may be indicated by the meter.

With the above objects in view as well as others that will become apparent during the course of the following disclosure, reference will be had to the accompanying drawing forming part of same and wherein:

Figure 1 is a vertical longitudinal sectional view substantially on planes represented by the broken line 1—1 in Figure 2 of a fluid meter constructed in accordance with a preferred embodiment of the invention.

Figure 2 is a horizontal sectional view substantially on a plane represented by line 2—2 in Figure 1.

Figure 3 is an elevational view of the construction indicated in Figure 1 as seen in the direction of arrow 3 with the bottom meter casing and register box removed.

Referring to the drawing by reference characters in which like characters designate like parts, 11 designates the top casing of a fluid meter, which, as indicated, is of the nutating disk type but may be of any other well known type of construction. Casing 11 is provided with the usual inlet and outlet connections 12 and 13 and within the casing and between which connections are removably disposed the measuring member 14 which is of usual construction comprising the disk chamber 15, nutating disk 16, disk ball segments 17, and disk spindle 18. The disk chamber 15 is maintained in casing 11 in engagement with a shoulder 19 therein by means of the removable bottom casing 21 secured in position by bolts 22 engaging lugs on casing 11 and the slotted lugs 23 on bottom casing 21 in the usual manner, a gasket 25 being interposed between chamber 15 and casing 21 and engaging a shoulder 26 in casing 11. A screen 26' is disposed between inlet 12 and chamber 15.

Removably supported on chamber 15 within the upper part of casing 11 is a reduction gearing unit 27 adapted for operation by disk spindle 18 and rotative movement is imparted from gearing 27 to the stuffing box spindle 28 through the co-operating arms 29 and 31 carried by gearing 27 and spindle 28 respectively. Spindle 28 is rotatably mounted in a stuffing box 32 and is provided on the outer end thereof with a pinion 33 in mesh with a gear 34 of the register mechanism supported within box 35 supported on casing 11.

The construction so far described is a well known type of fluid meter in the operation of which fluid passes from inlet 12, through disk chamber 15 imparting nutating motion to disk 16 and out through outlet 13, the movement of disk 16 through spindle 18 imparting movement to gearing 27 which in turn imparts movement to the registering mechanism.

Fluid meters of this general construction are not extremely accurate in the measurement of fluid unless operated at uniform speed. This is due to the fact that at intermediate rates of flow a greater registration is indicated than at maximum and minimum rates of flow for equal actual volumes of fluid passed, thus resulting in an inaccurate indication of the fluid passed.

In accordance with our present invention in order to obviate the inaccuracies just noted the casing 11 is provided with an integral casing enlargement 37 adjacent outlet 13 preferably to the right thereof as indicated in the drawing. The interior of casing 37 is in the form of a vertically elongated chamber 38, which as clearly indicated in Figure 2, is circular in cross section and as indicated in Figures 1 and 3 the chamber 38 tapers from the central transverse plane thereof toward both ends thereof.

The upper end of chamber 38 is shaped, as indicated at 39 to provide an effective valve seat communicating with the outer end of chamber 38 through valve seat 39 in the inner end of a substantially small port 41 whose outer end communicates with an angularly disposed port 42 in an outer angularly disposed end of casing 37. The port 42 at the inner end thereof communicates with the outer end of a vertically elongated chamber 43 in communication with outlet 13 and the outer end of port 42 opens through casing 37 outwardly of port 41 in the form of an enlarged tapped recess for the removable reception of a screw threaded closure plug 44, that closes the open end of the port 42. The inner end of casing 37 is provided with a vertical bore 45 in axial alinement with chamber 38, with which communicates adjacent the inner end thereof one end of a port 46, the opposite end of which communicates with casing 11 adjacent the bottom of disk chamber 15.

Removably positioned in bore 45 is a valve seat member 48 provided with a countersunk valve seat 49 and an angular port 51 for communication with chamber 38 and port 46, whereby casing 11 is placed into communication with outlet 13 through a by-pass conduit comprising ports 46 and 51, chamber 38, ports 41 and 42 and chamber 43.

Valve seat member 48 is removable for the positioning and removal of a spherical valve member 53 movably disposed in chamber 38 and adapted for alternate co-operation with seats 39 and 49. The member 48 at the outer end thereof is provided with a gasket 54 for engagement with a shoulder 55 defined at the junction of chamber 38 and bore 45, and a second gasket 56 is maintained against the inner end of member 48 and a shoulder 57 defined by an internally threaded enlargement 58 of the inner end of bore 45, in which is removably positioned a threaded plug 59 for engagement with gasket 56 for removably holding member 48 in position and with gaskets 54 and 56 in fluid tight sealing engagement.

In operation of the meter construction above disclosed, fluid flows through casing 11 from the inlet 12 to the outlet 13 around and through disk chamber 15 in the directions indicated by the arrows on the drawing, the fluid in its passage through chamber 15 imparting movement to disk 16 which in turn operates the registering mechanism through spindle 18, reduction gearing 27, spindle 28 and meshing pinion 33 and gear 34.

The spherical valve member 53 is preferably made of hard rubber and is adapted to vary its vertical position in accordance with the flow through the meter, the force of gravity tending to seat the ball on valve seat 49, and the fluid moving through the by-pass port 46 tending to force the ball off its seat and up into passage 38, the rate of flow accordingly controlling the passage of fluid between the walls of chamber 38 and valve 53 for regulating the by-pass flow for accurate registration by the meter at all rates of flow.

When operating under minimum and maximum flows the valve 53 will rest in seats 49 and 39 respectively thus preventing any by-passing of fluid, while at intermediate rates of flow valve 53 will be held in suspension between seats 39 and 49 thus permitting the by-passing of fluid in proportionately greater volumes as valve 53 approaches the central portion of chamber 38 from either seat 39 or 49.

At low rates of flow the valve 53 will rest on seat 49 closing communication to chamber 38 as the drop in pressure between the inlet 12 and outlet 13 will not be sufficient to lift it.

At high or maximum rates of flow the pressure drop in casing 11 is sufficient to lift valve 53 into contact with seat 39 thus preventing the by-passing of any fluid.

At flow rates intermediate the minimum and maximum, valve 53 will remain in suspension opposite the portion of greatest diameter of chamber 38 as indicated in Figure 1 thus permitting the maximum by-passing of fluid, while at flows greater or less than the intermediate, valve 53 will be suspended above or below the intermediate position indicated in Figure 1.

It will be noted that the port 46 communicates with the meter casing at a point to the side of the outlet 13. From an inspection of Figure 2 it will be seen that the fluid passing through the meter changes its path sharply just above opening 13 due to partition 61 and enters the metering chamber 15. The outer wall of metering chamber 15 is spaced from the inner wall of housing 11 and a practically dead area as regards fluid flow through the meter occurs at the point where port 46 enters housing 11. The by-pass is therefore not subjected to disturbances due to turbulence of the fluid, and more accurate results may be thus obtained.

It will be seen from the foregoing disclosure that increasing volumes of fluid are by-passed as the rate of flow varies from either minimum or maximum to intermediate at which the maximum volume of fluid is by-passed which is the rate at which in prior constructions the greatest registration proportionate to volume passed was indicated.

The chamber 38 is so formed and proportioned as well as spherical valve 53 and the interconnecting ports as to cause the meter to register accurately at all rates of flow.

As the by-pass valve construction is dependent upon pressure variations for its effective operation the casing 37 and accordingly the by-pass construction is preferably located to the right and closely adjacent outlet 13 as in the co-pending application of H. G. Weymouth, now Patent 1,755,905 granted April 22, 1930, wherein the fluid at this point is normally quiescent and wherein fluctuations in pressure will effect the by-pass flow in exact accordance as such fluctuations affect the rate of flow through the meter itself.

Although the passage 38 is shown and described as taking the shape of two truncated cones with a common base or barrel shaped, it will be clear that the shape of this passage could be elliptical, cycloidal, or spherical, or the outer surface could be angular.

The valve 53 could also take various shapes to cooperate with the particular shape of passage 38, the only essential being that the by-pass allows maximum flow therethrough at intermediate flows through the meter and decreasing flows therethrough at maximum and minimum flows through the meter.

Although the valve 53 has been described as made of hard rubber it will be clear that various other materials could be used.

The ball valve 53 has been shown as dependent upon the force of gravity for approaching and seating against valve seat 49 when the flow in the meter is lower than normal or intermediate flow, but it will be obvious that the ball valve may be biased to approach and seat against the valve seat in any well known manner.

While we have described and illustrated certain specific embodiments of our invention it is to be understood that they are merely illustrative and not restrictive; and that various changes, modifications, substitutions, omissions and additions may be made without departing from the spirit and scope of the invention which is defined in the subjoined claims.

What we claim is:

1. A fluid meter comprising a casing provided with a fluid inlet and a fluid outlet, metering mechanism interposed between said inlet and said outlet, a by-pass connecting said inlet and outlet around said metering mechanism, and valve mechanism in said by-pass housed in a member containing a chamber having two spaced valve seats and a valve for cooperation with said seats, said valve so cooperating with the walls defining said chamber to allow maximum flow in the by-pass when the valve is spaced midway between said seats.

2. The invention as defined in claim 1 wherein said valve is biased to engage one valve seat when flow in said metering mechanism is at a minimum.

3. The invention as defined in claim 1 wherein the valve progressively throttles fluid flow in said by-pass as said valve approaches either valve seat.

4. The invention as defined in claim 1 wherein the spaced valve seats are adjacent the two ends of a chamber housing said valve, the walls of said chamber converging from the center to the valve seats.

5. The invention as defined in claim 1 wherein the spaced valve seats are adjacent the two ends of a vertical chamber, the walls of said chamber converging from the center to the valve seats, and said valve is a ball check valve.

6. The invention as defined in claim 1 wherein the spaced valve seats are adjacent the ends of a chamber housing said valve, said chamber having a cross-section of two truncated cones with a common base, and said valve is a ball check valve which is biased toward one of said valve seats.

7. A fluid meter comprising a casing provided with a fluid inlet and a fluid outlet, metering mechanism within said casing through which liquid passes from said inlet to said outlet, a by-pass connecting said inlet and outlet around said metering mechanism, a vertical valve chamber in said by-pass and having the shape of two truncated cones with a common base, and a ball check valve in said chamber automatically controlling the flow therethrough.

8. A fluid meter comprising a casing provided with a fluid inlet and a fluid outlet, metering mechanism within said casing through which liquid passes from said inlet to said outlet, a by-pass connecting said inlet and outlet around said metering mechanism, a vertical valve chamber in said by-pass and having the shape of two truncated cones with a common base, a ball check valve in said chamber automatically controlling the flow therethrough, said ball valve seating against the top of said chamber on high flows and on the bottom of said chamber on low flows, thus shutting off the flow of liquid through the by-pass when high and low flows are being measured through the fluid meter.

9. In combination with a fluid meter having a measuring chamber provided with an inlet and outlet therefor, and a by-pass between the said inlet and outlet and around the measuring chamber, a vertical barrel-shaped chamber in said by-pass, a valve in said chamber to permit fluid flow through said by-pass automatically on intermediate flows through the meter, said valve seating against the top of said chamber for preventing passage of fluid on high flows, and seating on the bottom thereof for preventing passage of fluid on low flows.

In testimony whereof I affix my signature.
HORACE CHRISMAN.
In testimony whereof I affix my signature.
HARRY G. WEYMOUTH.